United States Patent [19]

Hubertson

[11] Patent Number: 4,770,393
[45] Date of Patent: Sep. 13, 1988

[54] BUTTERFLY VALVE

[75] Inventor: Folke Hubertson, Saffle, Sweden

[73] Assignee: Aktiebolaget Somas Ventiler, Saffle, Sweden

[21] Appl. No.: 138,578

[22] Filed: Dec. 28, 1987

[30] Foreign Application Priority Data

Jan. 2, 1987 [SE] Sweden ................................ 8700003

[51] Int. Cl.[4] .............................................. F16K 1/22
[52] U.S. Cl. ..................................... 251/306; 251/305
[58] Field of Search ................ 251/305, 306, 307, 308

[56] References Cited

U.S. PATENT DOCUMENTS

| 3,809,361 | 5/1974 | Pfundstein et al. | 251/305 |
| 3,963,213 | 6/1976 | Brattberg | 251/306 |
| 4,254,937 | 3/1981 | Hubertson | 251/306 X |
| 4,284,264 | 8/1981 | Hubertson | 251/306 X |
| 4,286,769 | 9/1981 | Hubertson | 251/306 X |

Primary Examiner—A. Michael Chambers
Assistant Examiner—John C. Fox
Attorney, Agent, or Firm—Murray and Whisenhunt

[57] ABSTRACT

A butterfly valve comprises a valve housing (1) with an axial passage (4) for a fluid medium; a valve seat in the form of a seat ring (8) which is displaceable within a slot (7) in the valve housing in a radial direction relative to the axial passage, the seat ring elastically deformable as to its shape in the radial direction; and a throttle (5) arranged so as to be pivotable about an axis of rotation (23) between an open position and a shut-off position, the throttle having a seal face (21) on its periphery (18) which is pressed against the seat ring when the throttle is in the shut-off position. The shape of the seal face is defined by lines of intersection between the seal face and planes of intersection coinciding with a center line (22) of the throttle. Lines of intersection between the seal face and a first plane, coinciding with the axis of rotation of the throttle and perpendicular to a plane of symmetry of the throttle consist of circular arcs having a first radius, R, with a foot point on the axis of rotation. Lines of intersection between the seal face and all other planes of intersection have a curvature other than said first radius, R.

15 Claims, 8 Drawing Sheets

BUTTERFLY VALVE

BACKGROUND OF THE INVENTION

1. Field of the Invention

This invention relates to a butterfly valve comprising a valve housing with an axial passage for a fluid medium; a valve seat in the form of a seat ring of metal or other material with comparable rigidity, the seat ring being displaceable in the radial direction in a slot in the valve housing and also elastically deformable as to its shape in the radial direction, a throttle arranged so as to be pivoted about an axis of rotation by means of a stem between an open position and a shut-off position, a peripheral seal face on the throttle being pressed against the seat ring in said shut-off position; and means provided for retaining the seat ring in its position in the slot when the throttle is rotated from the shut-off position to the open position and for retaining the shape adapted to the seal face of the throttle which the seat ring has adopted.

2. Description of the Prior Art

A throttle of the above mentioned type is described e.g. in U.S. Pat. No. 4,284,264. This throttle can cooperate with valve seat rings which may have various designs. By way of example the seat ring may have the design which is shown in the said U.S. patent specification or a design disclosed, e.g. in SE-B-No. 445 382. Other designs are conceivable if means are provided to retain the seat ring in the position which the ring has adopted when the throttle has been rotated from the open position to the shut-off position when the valve is being assembled, i.e. at the so called "virgin shut-off movement". It is a common feature of these seat rings that they have a curved sealing surface turned towards the fluid passage. The sealing contact between the two sealing surfaces in the sealing position will therefore occur along a narrow zone and with practically linear contact. In order to obtain simultaneous tightening between the throttle and the seat around the circumference, the known throttle has an ovality in a plane parallel to the side surfaces of the throttle, hereafter referred to as the zero-plane, the major axis being perpendicular to the axis of rotation of the throttle, and thereby also avoiding the throttle touching the seat at an initial phase of the shut-off movement, as well as substantial sliding between the surfaces. For the same purpose the periphery of the throttle has been given a complex double-curved shape, characterized in that the lines of intersection between the throttle periphery and a first plane of intersection through the throttle, coinciding with the axis of rotation and perpendicular to a plane of symmetry through the throttle, consist of arcs of a circle having its centre substantially on the axis of rotation, while the lines of intersection between the throttle periphery and a second plane of intersection defined by the said symmetry plane through the throttle, perpendicular to the axis of rotation, consist of straight lines, the extensions of which will meet, and the curvature of the sealing face of the throttle successively merges from the first mentioned circle in the said first plane of intersection into indefinitely large circles, that is to say, straight lines in the said plane of symmetry. This known butterfly valve has in comparison with previous designs brought about a considerable technical achievement and is today the dominant butterfly valve in Scandinavia, at least in the paper and pulp industry.

However, the above mentioned valve has a few deficiencies. Thus the geometry of the throttle surface is difficult to manufacture with a mathematically correct shape due to the fact that the shape is difficult to program for computerized production. Some approximations must be made in the computer program which means that a mathematically exact shape will not be achieved. In practice this means that the sealing surface on the throttle periphery will have some humps which counteract a simultaneous sealing contact between the seat and the throttle around the whole periphery. Theoretically these problems could be eliminated if one could guarantee that the sealing contact between the throttle and the seat occured exactly in the zero-plane. In practice, however, there are no such guarantees because of manufacturing tolerances, wear from the medium transported through the valve, variations in temperature and torque, etc. Therefore the sealing face on the periphery of the throttle must have a larger breadth than the breadth of the zone of contact in a certain sealing position, so that the plane coinciding with the contact line or contact zone in a certain sealing position may be permitted to form an angle with the zero-plane. Initially this angle is negative, which means that one will achieve the shut-off position slightly before the zero-plane when the throttle is shut off for the first time. Also in this position absolute tightness shall be achieved without subjecting the stem of the throttle to high torques. A good sealing result can be achieved in these positions if one has a high ratio between, on one hand, the surface pressure between the throttle and the seat and, on the other hand, the torque applied to the stem, at the same time as the throttle has a perfect or nearly mathematically perfect elliptic shape in the plane coinciding with the line or zone of contact in each sealing position. These ideal conditions do not exist in the above mentioned, known valve which is characterized in that the lines of intersection between the plane of symmetry and the periphery of the throttle are defined by straight lines. The straight line in the said section will cause a lower surface pressure/torque ratio than what is desirable, and the shape of the line or zone of contact in the said plane which forms an angle with the zero plane will be more or less distorted, resembling the shape of a longitudinal section through an egg.

SUMMARY OF THE INVENTION

An objective of the present invention is to further improve the above mentioned known butterfly valve. The purpose of the invention thus is to provide a valve by which a simultaneous sealing contact is achieved around the periphery at the same time as a high sealing pressure is obtained at a certain torque, as well as providing a valve wherein a sealing good contact between the seat and the throttle in the line or zone of contact is achieved when the plane defined by the line of contact forms an angle with the zero plane. The latter purpose in its turn means that the geometry of the periphery of the throttle shall be such that it can be easily programmed for computerized production, that is to say that such approximations need not be introduced into the computer program which would cause humps or other deviations from the desired geometric shape during production. More particularly, the latter in its turn means that the sealing face of the throttle in a plane coinciding with any conceivable line or zone of contact within the area of the sealing face of the throttle shall have a nearly perfect desired elliptic shape, or a shape at which the deviations from the mathematical elliptic shape can be neglected.

These and other objectives can be achieved through the provision of the invention as set forth in the appended claims and following description of a number of preferred embodiments.

BRIEF DESCRIPTION OF THE DRAWING FIGURES

The invention will be explained, in detail, with reference to the drawings, in which FIG. 1 is a planar view of a closed valve seen towards that side of the throttle which is turned from the stem of the throttle, FIG. 2 at a larger scale shows a section along the line II—II in FIG. 1, perpendicular to the axis of rotation of the throttle in a plane coinciding with the symmetry plane of the throttle, the dimensions in the direction of the flow of the fluid through the valve having been somewhat exagerated, FIG. 3 is a section along the line III—III in FIG. 1 in a plane coinciding in the area of the valve housing with the axis of rotation of the throttle and in the area of the throttle coinciding with the centre line of the throttle, in the following referred to as the axial plane of the throttle, FIG. 4 schematically shows a throttle in a planar view in the same direction as FIG. 1, FIGS. 5–9 schematically show sections along the lines V—V . . . IX—IX in FIG. 4 according to a first preferred embodiment of the invention, FIG. 10 schematically illustrates in a perspective view the geometry of the throttle according to this first embodiment, FIGS. 11–15 shematically show sections through the throttle along the lines XI—XI . . . XV—XV in a corresponding way as FIGS. 5–9 but in a second embodiment of the invention, and FIG. 16 schematically illustrates a perspective view of the geometry of the throttle according to this second embodiment.

DESCRIPTION OF PREFERRED EMBODIMENTS

Figure 1:
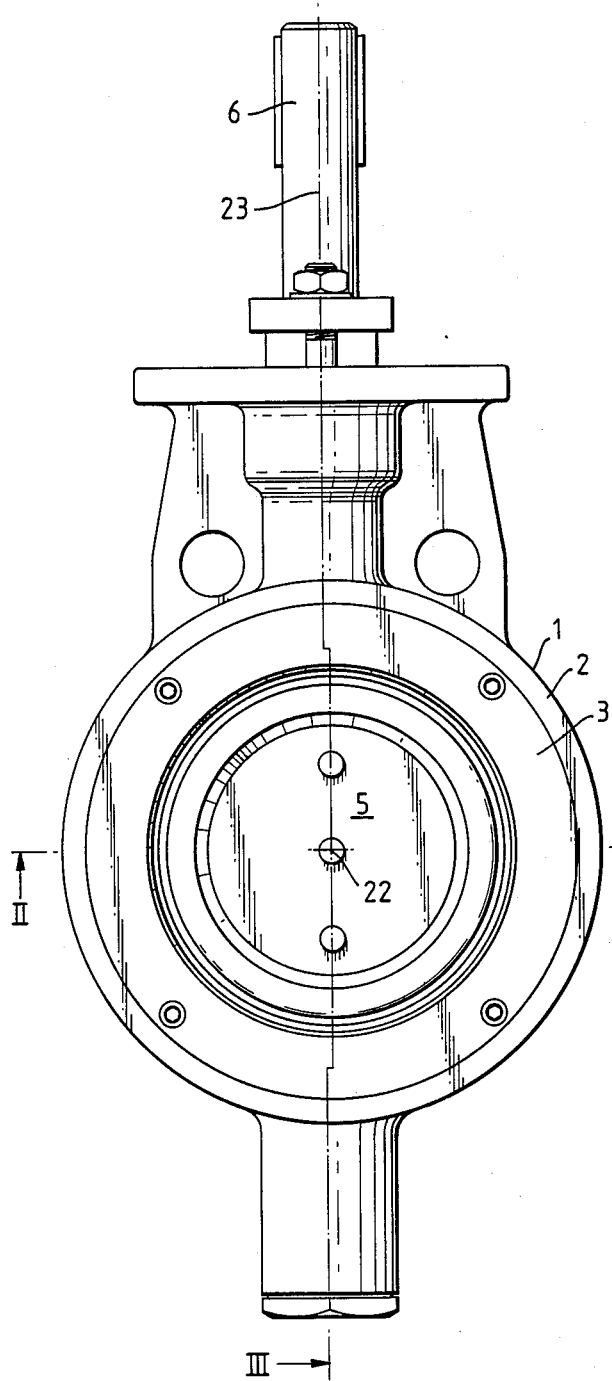
Figure 3:
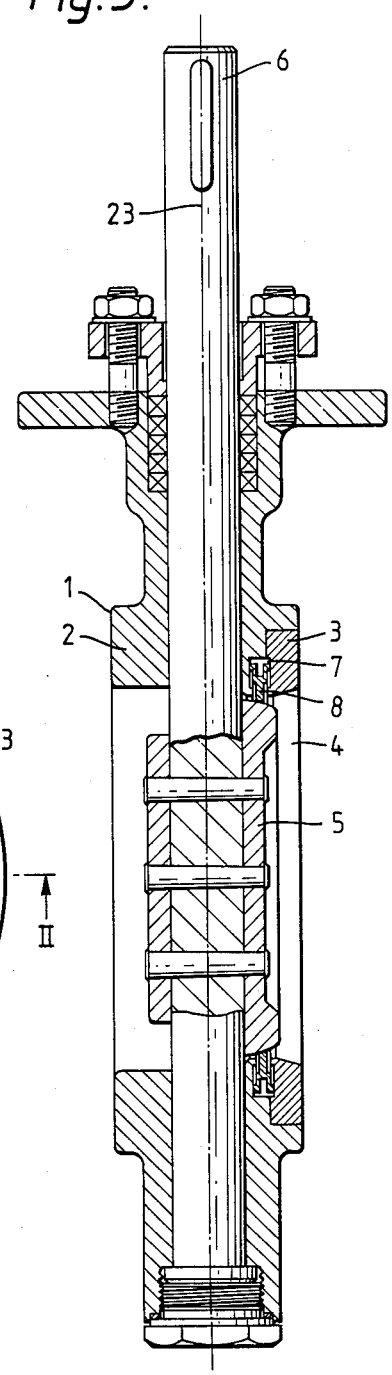
Figure 2:
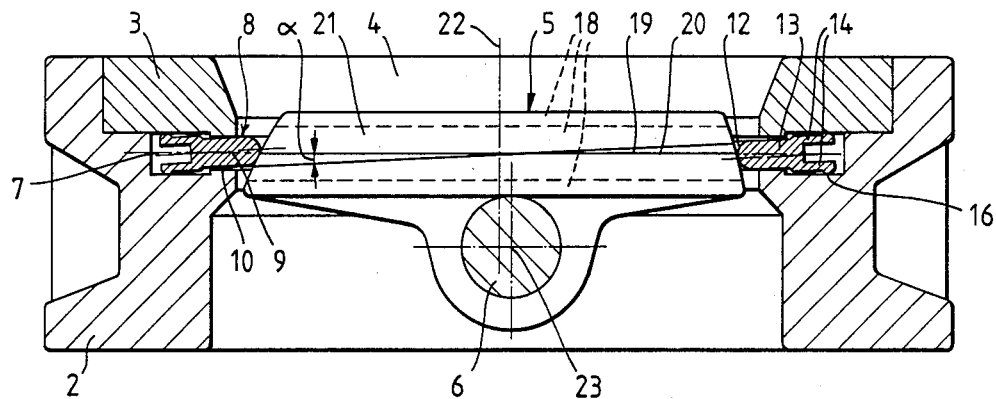

With reference first to FIGS. 1–3, a valve housing generally has been designated 1. The valve housing consists of a main part 2 and a cover ring 3. A passage through the valve has been designated 4. A throttle 5 can be rotated from a sealing position, as shown in FIG. 2, to an open position and vice versa by means of a stem 6 which is journalled in the main part 2 of the valve housing 1. For rotation of the stem 6, there are provided actuating means which are not shown in the drawings.

A seat ring 8 is provided in an annular slot 7 in the valve housing 1 between the main part 2 and the cover ring 3. The seat ring normally consists of stainless, acid resistant steel or a very rigid plastic material and is, in other respects, designed according to the said SE-B-No. 445 382, the disclosure of which is incorporated herein by reference. The ring 8 also may consist of a composite material or may be composed of several materials. The ring 8 has a section which has a "creature"-resembling configuration with an elongated body part 8. The two sides 10 are completely flat and parallel. At the end of the ring, which is directed toward the throttle 5, the body part 8 has a "head" part with a bluntly rounded surface 12, which constitutes the sealing surface of the valve seat, against which the throttle 7 may be pressed.

From the "hip" 13 of the body part 8, i.e. from the outer peripheral portion of the ring 8 a pair of annular flanges 14 extend radially, symmetrically outwards. In the section illustrated, the flanges 14 form the legs of the "creature"-resembling figure. On each of the flanges 14 there extends an outwardly pointing ledge 16. The two ledges 16 are pressed resiliently, by spring action, in the axial direction against the walls of the slot 7. The configuration of the seat ring 8 and also the selection of a proper material in the seat ring 8 ensure the desired combination of radial rigidity, axial flexibility and sealing ability against the sides of the slot 7 in the axial direction. In order to achieve a sealing action the seat ring 8, therefore, need not be pressed in the radial direction against the bottom of the slot 7. On the contrary, the slot 7 is so deep that the ring 8 may be displaced radially, i.e. the diameter of the slot 7 is essentially greater than the maximal outer diameter of the seat ring 8. The position and the shape of the seat ring 8 is thus adaptable to the throttle 5 when the valve is first closed, the so called "virgin closure" action. The flanges 14 at the same time are so stiff or rigid, in other words, their spring action is so great, that it ensures that the seat ring 8 will retain position and essentially also maintain the change of shape which it has obtained at the virgin closure action. More particularly, the seat ring 8 has obtained an elliptic shape at the virgin closure action, which will be explained more closely in the following. A certain spring back from this elliptical shape of the ring back to the original circular shape will occur when the valve is re-opened but the main part of the elastic deformation which the seat ring obtained at the virgin closure action will be retained.

The periphery of the throttle 5 has been designated 18. A circumferential middle line on the periphery 18 has been designated 19. A plane coinciding with this middle line 19 defines the previously mentioned zero-plane, which has been designated 20. In the ideal case, the middle line 19 is the line of contact between the throttle and the seat when the seat 5 is brought to sealing contact with the seat ring 8. It should, however, be understood that the contact between the throttle and the seat ring does not occur along a line in the mathematical sense, but along a narrow zone. It should also be understood that the line or zone of contact seldom occurs on the middle line 19 (the zero-plane 20) because of the influence of manufacturing tolerances, wear, varying temperatures and deformations caused by such variations, etc. For these reasons one has to make use of a larger area of the periphery 18 of the throttle. This area which may be used for the sealing action has been shaded to FIG. 2 and will, in the following, be referred to as the sealing face 21 of the throttle. The breadth of this sealing face 21 may vary from case to case. As a practical rule the breadth of the sealing face 21 is ⅔ of the breadth of the periphery 18 of the throttle. A reason why the periphery 18 of the throttle is somewhat broader than the sealing face 21 is that the outer surfaces of the periphery on both sides of the sealing face 21 consitute a safety zone against a "super rotation" of the throttle, that is a rotation of the throttle beyond the seat when closing the valve, which, if it occured, would cause the valve to be inoperable.

The shape of the periphery 18 of the throttle 5 according to the first embodiment now will be explained more closely with reference to FIGS. 4–10. As has been mentioned in the introductory part of this specification, the invention is intended to provide a valve with a high ratio between the pressure exserted by the throttle upon the seat and the torque applied to the stem; an elliptic shape of the line or zone of contact in each position of contact on the sealing face 21 of the throttle; a simultaneous sealing contact around the periphery; and a possibility to transfer the geometry to a computer program for computerized production of the periphery of the throttle, which objectives can be achieved through the new design of the geometry of the throttle.

Figure 4:
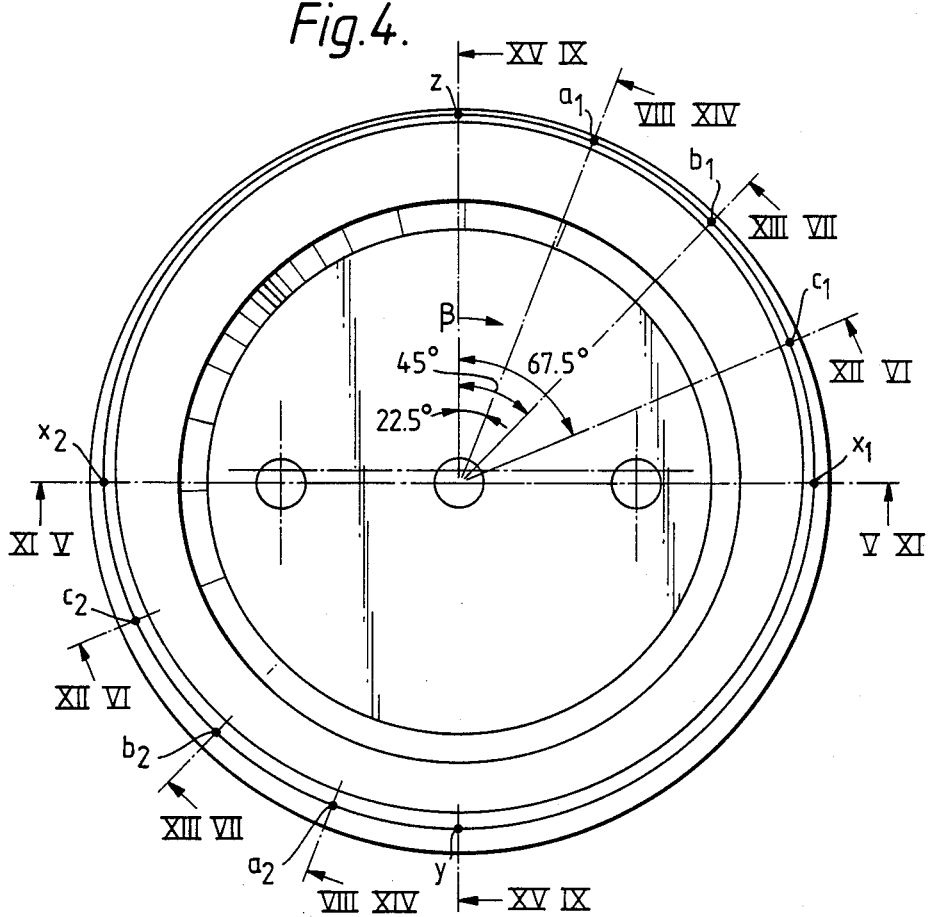
Figure 5:
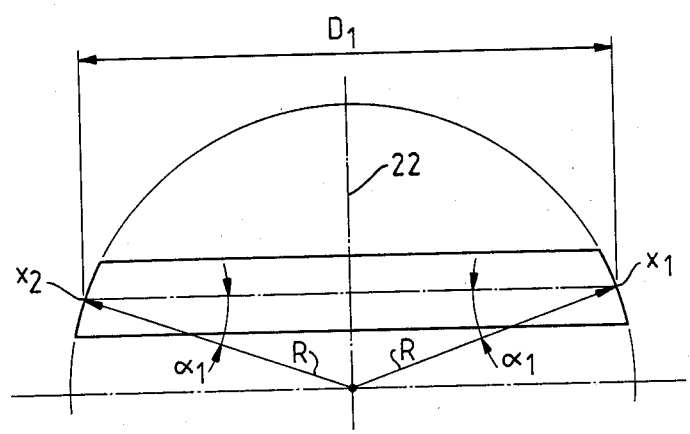
Figure 6:
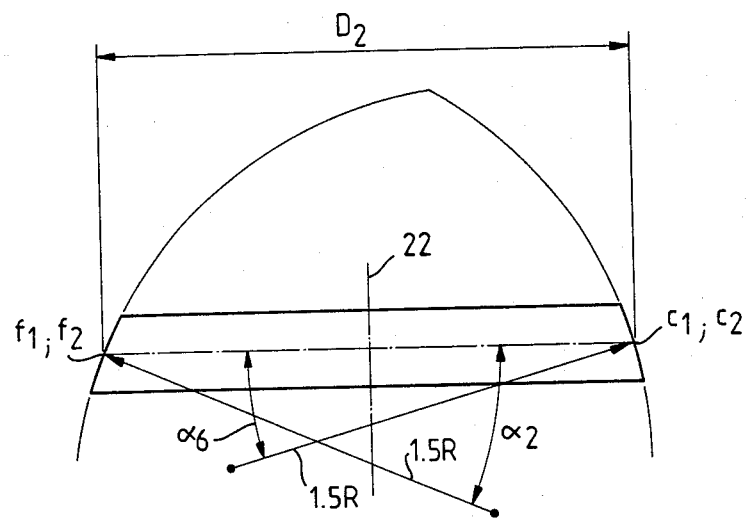
Figure 7:
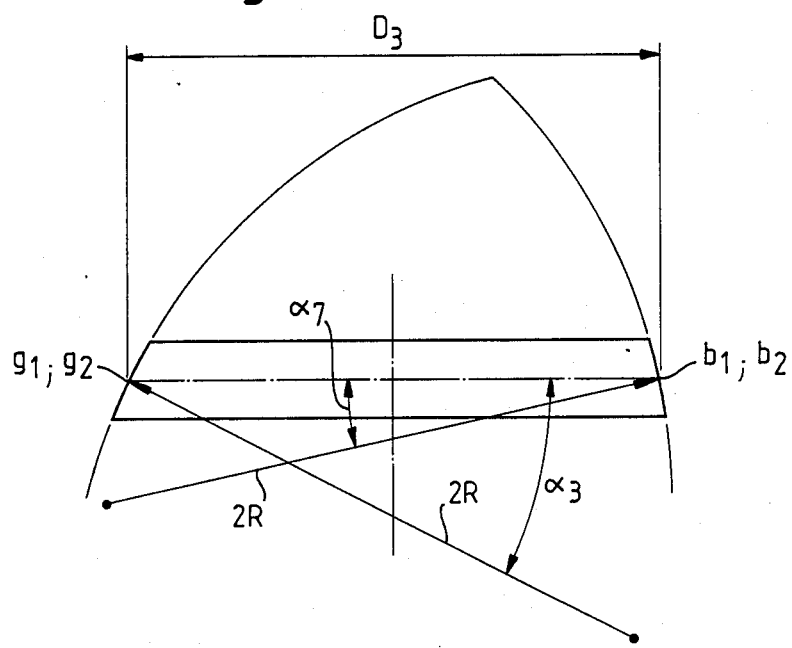
Figure 8:
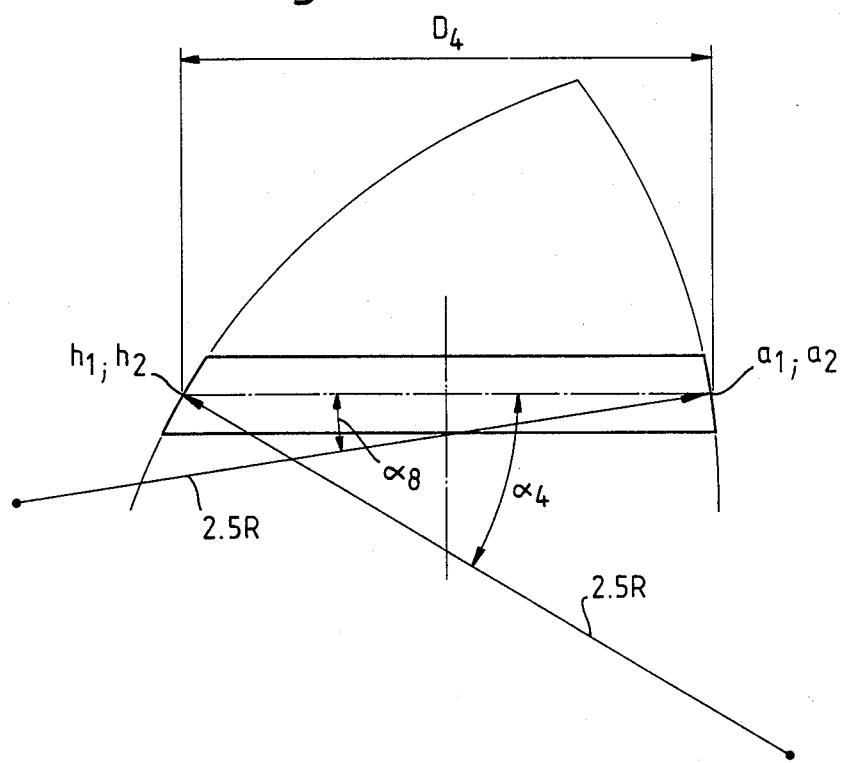
Figure 9:
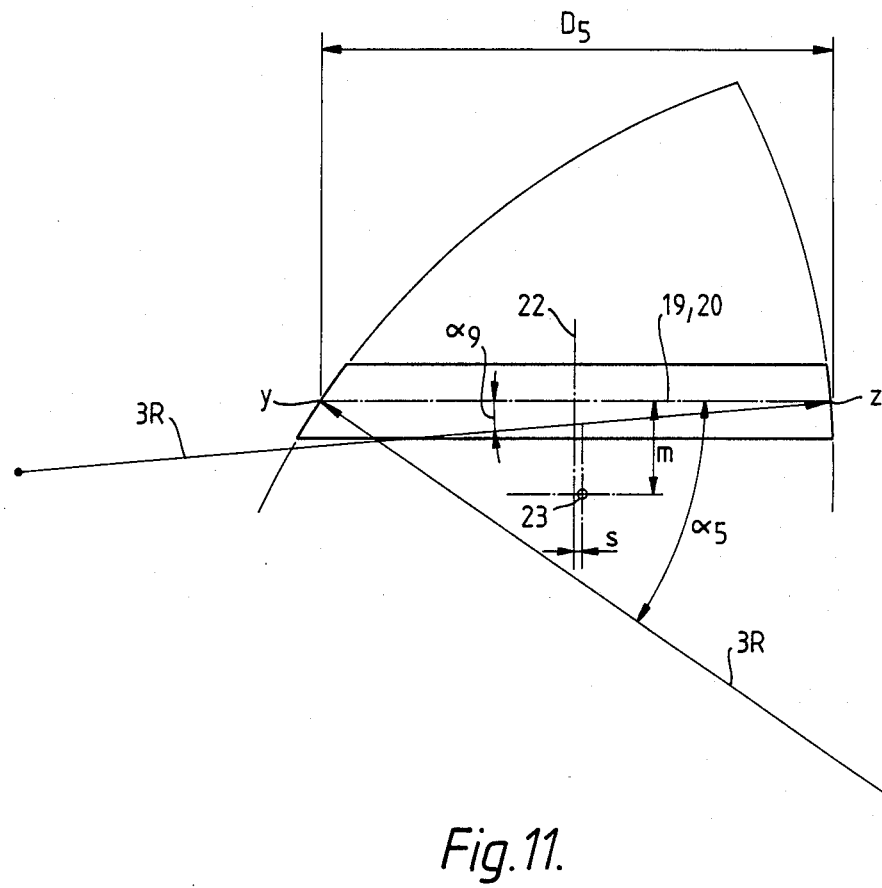

FIG. 9 shows the symmetry plane of the throttle 5 in a section IX—IX in FIG. 4. FIG. 5 shows the throttle in an axial section in a view V—V in FIG. 4 in an angular position $\beta=90°$; 270°, the angle $\beta$ being counted clockwise from a vertical line starting from a centre line 22 perpendicularly against the zero-plane 20. FIG. 6, FIG. 7 and FIG. 8 show the sections in the angular positions $\beta=67.5°$; 247.5°, $\beta=45°$; 225°, and $\beta=22.5°$; 202.5° respectively. The other parts of the throttle disc constitute inverted copies of the first mentioned parts.

In the axial section, FIG. 5, the throttle has a peripheral profile defined by a radius R having its foot point on the centre line 22 of the throttle. The points $x_1$ and $x_2$ are points of intersection between the middle line 19 and the axial section. Corresponding points in the section in FIG. 6 have been designated $c_1$; $c_2$ and $f_1$; $f_2$, respectively; in FIG. 7 $b_1$; $b_2$, and $g_1$; $g_2$, respectively; in FIG. 8 $a_1$; $a_2$, and $h_1$; $h_2$, respectively, and in FIG. 9 z and y, respectively. In the section in FIG. 6 the periphery of the throttle—or more correctly its generatrix—has a radius of curvature=1.5R; in the section in FIG. 7 it has a radius of curvature=2R, in the section in FIG. 8 it has increased to 2.5R and in the plane of symmetry the periphery 18 of the throttle has a radius of curvature=3R. Between the mentioned sections the radius of curvature continuously increases from R in the axial section ($\beta=90°$; 270°) to the radius of curvature=3R in the plane of symmetry, where $\beta=0$; 180°, FIG. 9. In any chosen angular position $\beta_n$ between 0° and 90° the following expression applies for the length of the corresponding radius $R_n$.

$$R_n = R \cdot (2 - \cos 2\beta_n) \qquad (1)$$

The radius R is determined by the axial eccentricity m, i.e. the distance between the axis of rotation 23 and the zero-plane 20 such that $$R = \left[\left(\frac{D_1}{2}\right)^2 + m^2\right]^{\frac{1}{2}} \qquad (2)$$

In the expression above, $D_1$ is the diameter, or more correctly the length of the minor axis of the middle line 19. The angle of inclination $\alpha_1$ between the radius R and the zero-plane 20 is determined by the expression $$\tan \alpha_1 = m/D_1 \qquad (3)$$

In the plane of symmetry, FIG. 9, the throttle has the diameter, or more correctly the length of the major axis designated $D_5$ in the zero-plane 20. The difference between the major axis $D_5$ and the minor axis $D_1$ depends on the size of the valve. In the case of the smallest valves, which means valves having a diameter of approximately 75 mm, the ovality is 0.5 to 0.6 mm, which means that the major axis $D_5$ is 0.5 to 0.6 mm larger than the minor axis $D_1$. In the case of the largest valves, which means valves with throttle diameters in the order of 1200 mm, the ovality is 1.5 to 1.6 mm. For intermediate dimensions the ovality increases continuously from 0.5 to 0.6 mm to 1.5 to 1.6 mm.

In the plane of symmetry, FIG. 9, the radius of curvature 3R towards the point y inclines of an angle $\alpha_5$ to the zero-plane 20, which angle $\alpha_5$ is not less than 8° and not more than 16° larger than the angle $\alpha_1$ while the radius 3R towards the point z inclines to the zero-plane 20 at an angle of inclination $\alpha_9$, which is not less than 8° and not more than 16° less than the angle $\alpha_1$. Between the points z and y (0°–180° and 180°–360°, respectively) the expression (4) applies as far as the angle of inclination of the radius of curvature to the zero-plane 20 is concerned. The angle $\beta_n$ as before is the angle of the section to the symmetry plane, starting from the point z.

$$\alpha_n = \alpha_9 + \frac{1 - \cos \beta_n}{2} \cdot (\alpha_5 - \alpha_9) \qquad (4)$$

The other half of the throttle disc (180°–360°) is an inverted copy of the first half.

Figure 10:
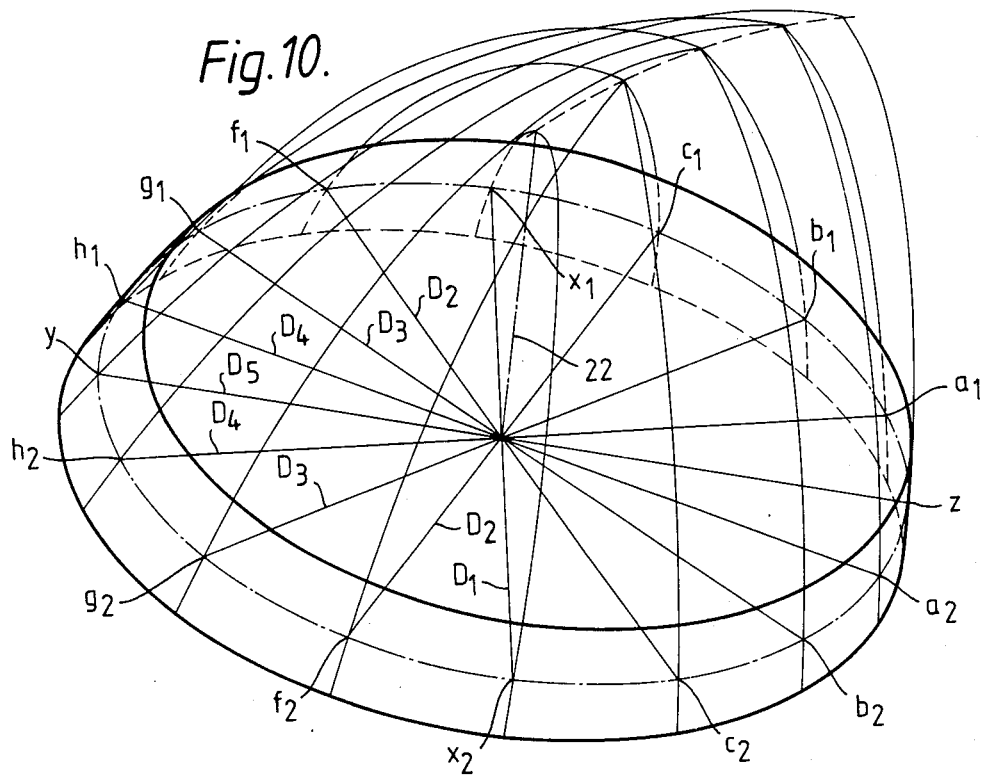
Figure 16:
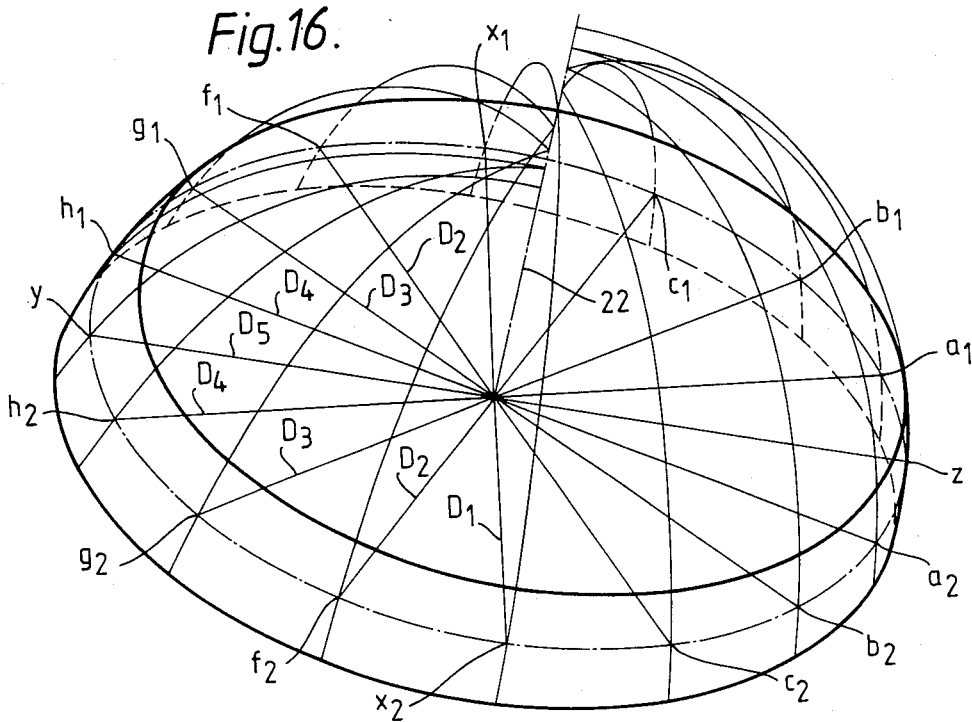
Figure 12:
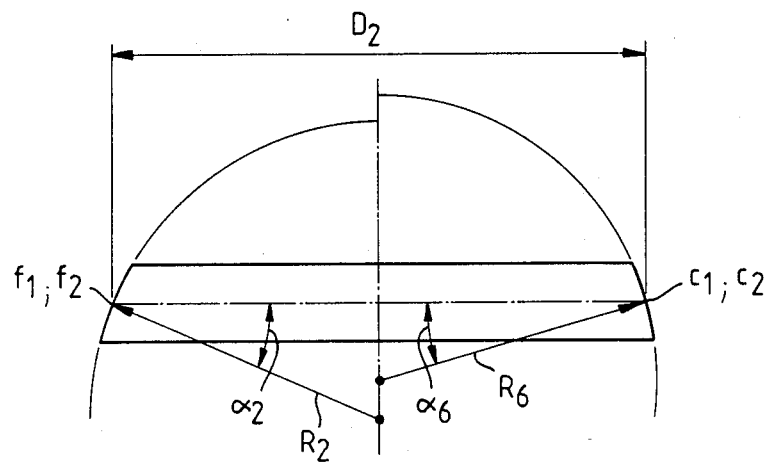
Figure 13:
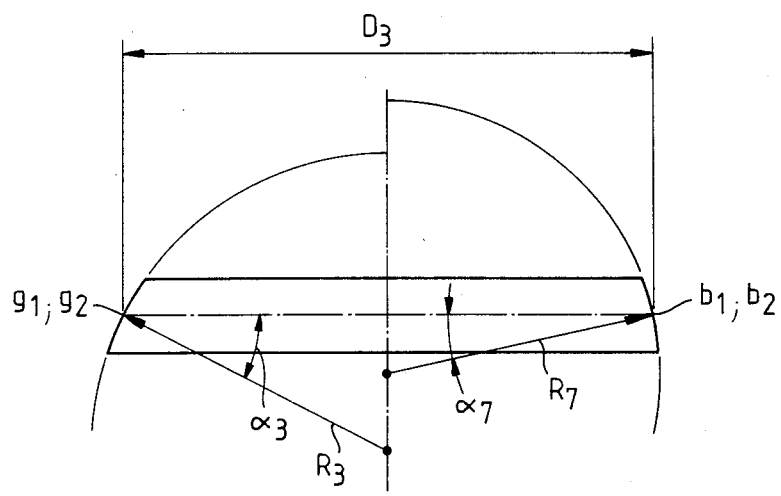
Figure 14:
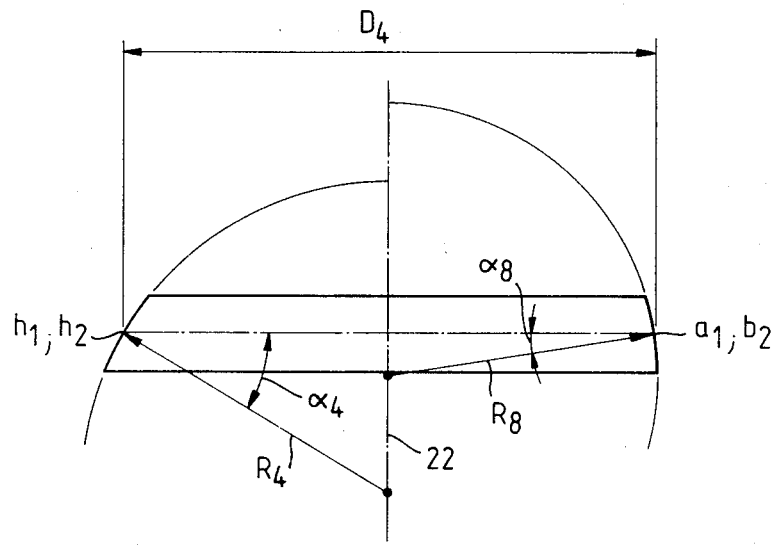
Figure 15:
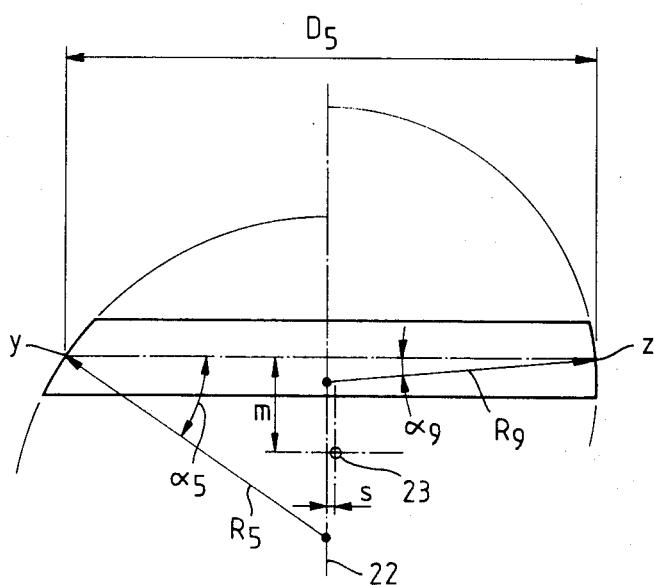

The lateral eccentricity s of the throttle described with reference to FIG. 10 is 0.5 mm max. for the smallest throttle diameters and 3 mm max. for the largest valves. It is, however, possible, for all dimensions, to completely eliminate the lateral eccentricity s, but a certain lateral eccentricity, however, not more than that mentioned above, is preferable in order to give an extra guarantee that contact will occur between the throttle and the seat only through simultaneous contact of the throttle against the seat circumferentially when closing the valve, and also that the contact simultaneously is interrupted when the valve is reopened, once the seat ring 8 has adapted itself to the geometry of the sealing surface 21 at the said "virgin shut-off movement".

All planes through a throttle with the throttle geometry described with reference to FIG. 1 to FIG. 10, parallel with the zero-plane, are elliptic. Also all other planes through the throttle within the region of the sealing face 21 of the throttle, inclined to the zero-plane 20, have a contour which very closely approximates an ellipse in the mathematical sense of the word. Even if the throttle during the closing action is rotated beyond the zero-plane 20 a certain angle $\gamma$—FIG. 2—one will thus obtain a line or zone of contact which has a desired elliptic shape. Thanks to the curvature in the plane of symmetry, FIG. 9, there is at the same time as the said rotation corresponding to the angle $\gamma$ an advantageous ratio between the pressure of contact and the torque applied to the stem.

In the embodiment according to FIGS. 5–10, the radius of curvature of the throttle always intersects the centre line 22 of the throttle except in the axial section, FIG. 5. In the axial plane, FIG. 5, the radius has its foot point on the centre line 22.

Figure 11:
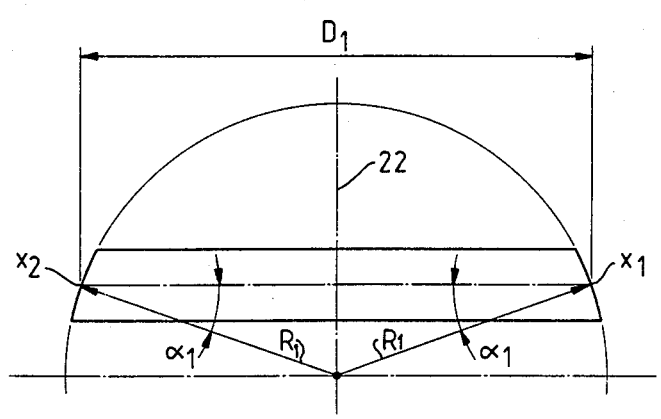

The throttle according to the embodiment shown in FIGS. 11–16 differs from the previous embodiment in that the radii $R_1$–$R_9$ in all the shown sections and in all sections therebetween, have their foot point on the centre line 22. The radius $R_1$ in the axial plane, FIG. 11, is equal to the radius R in the axial plane, FIG. 5, in the previous embodiment. The radius of curvature of the periphery of the throttle in all other sections coinciding with the centre line 22 is smaller than the radii of curvature in the corresponding sections in the previous embodiment. In any chosen section, where the diameter in the zero-plane 20 is $D_n$ and the distance from the foot point of the radius $R_n$ on the centre line to the zero-plane 20 is $m_n$, the length of the radius $R_n$ is determined by Pythagoras according to the expression:

$$R_n = \left[\left(\frac{D_n}{2}\right)^2 + m_n^2\right]^{\frac{1}{2}} \quad (5)$$

In other respects the throttle has the same dimensions, angles $\alpha_1$–$\alpha_9$, axial eccentricity $m_n$, lateral eccentricity s as in the previous embodiment. Also the ovality of the throttle disc is the same as in the previous embodiment. Further, for any conceivable line or zone of contact in the region of the sealing face 21 of the throttle, there is obtained an oval shape which with great accuracy is a methematically defined ellipse. It is an advantage of the embodiment according to FIGS. 11–16 that the geometry of the throttle periphery is easier, i.e. mathematically more exact than the embodiment according to FIGS. 5–10, and can be programmed for computerized manufacturing of the peripheral surface of the throttle. A further advantage is achieved in that there is obtained a still more advantageous ratio between the pressure of contact and the torque applied to the stem.

The embodiments above described only illustrate two examples of reducing the basic principle of the invention to practice. It is realized that many more variations utilizing circular curvatures in all sections are conceivable. However, non-circular curvatures of the peripheral surface of the throttle in planes of intersection coinciding with the centre line 22 of the throttle may also be used. By way of example the lines of curvature in the symmetry plane may be defined by involute curves, portions of Archimedian or logarithmic spirals, portions of parabolas or hyberbolas, or other non-circular curves. If any of these curvatures are chosen in the symmetry plane, the curvature shall decrease in the direction of the movement of the throttle in the symmetry plane as the valve is being closed. In other words the seat in the symmetry plane shall meet an increasingly levelled curvature on the peripheral surface of the throttle as the throttle is being closed. In the axial plane, however, the curvature also in these embodiments is circular, the radius having its foot point on the centre line as in the previous embodiments. Between the axial section and the symmetry section there are continuous transition forms between the circular curvature and the involute form, the spiral form or other corresponding curve form. The possibility within the framework of the present invention to choose these extremely complex throttle geometries has been mentioned in order to illustrate the possibilities of variations of the invention, and is not to be construed as any limitation thereon.

I claim:

1. In a butterfly valve comprising a valve housing (1) with a passage (4) for a fluid medium, said passage having a first axis; a valve seat in the form of a seat ring (8), said seat ring being displaceable in a radial direction, relative to said first axis, in a slot (7) in said valve housing and elastically deformable as to its shape in said radial direction; a throttle (5), having parallel sides, arranged so as to be pivotable about an axis of rotation (23) by means of a stem (6) between an open position and a shut-off position, said throttle having a seal face (21) on the periphery (18) of said throttle which is pressed against said seat ring (8) when said throttle is in said shut-off position; and means (14) for retaining said seat ring in position in said slot when said throttle is rotated from said shut-off position to said open position and for retaining, at the same time, the shape adapted to said seal face of said throttle when said throttle is in said shut-off position, characterized by
lines of intersection between said seal face (21) and a first plane of intersection through said throttle consisting of circular arcs having a first radius, R, with a foot point on said axis of rotation (23), said first plane of intersection coinciding with said axis of rotation and perpendicular to a plane of symmetry through said throttle; and
lines of intersection between said seal face (21) and all other planes of intersection coinciding with centre line (22) of said throttle which is perpendicular to said parallel sides of said throttle consisting of curved lines having a curvature other than said first radius, R, in said first plane of intersection.

2. The valve according to claim 1, wherein a line or zone of sealing contact between said seat ring and said throttle in the region of said seal face (21) of the throttle consists of an oval having an essentially elliptic shape and having a major axis of said elliptic shape coinciding with said plane of symmetry through the throttle.

3. The valve according to claim 2, wherein said throttle has an ovality of 0.5 to 1.6 mm.

4. The valve according to claims 2, wherein a radius of curvature, $R_9$, to a second (z) of two points (z, y) of intersection between a circumferential middle line (19) of said periphery and said lines of intersection between said periphery and said plane of symmetry is less than said first radius, R; and a radius of curvature, $R_5$, to a first (y) of said two points of intersection is larger than said first radius, R, but less than two times said first radius, R.

5. The valve according to claim 4, wherein curvature of said lines of intersection continuously increases from said first plane of intersection to said plane of symmetry on a half of said periphery of said throttle where said second of said two points of intersection is located; while curvature of said lines of intersection continuously decreases from said first plane of intersection to said plane of symmetry on an other half of said throttle where said first of said two points of intersection is located.

6. The valve according to claim 4, wherein said radii of curvature of said lines of intersection in said other planes of intersection have their foot point on said centre line of said throttle and the length of the radius of curvature, $R_n$, is determined by the expression:

$$R_n = \left[\left(\frac{D_n}{2}\right)^2 + m_n\right]^{\frac{1}{2}}$$

where $D_n$ is the diameter in the zero-plane and $m_n$ is the distance from the foot point of the radius $R_n$ to said zero-plane on said centre line.

7. The valve according to claim 1, wherein said curved lines having a curvature other than said first radius, R, in said first plane of intersection are selected from the group consisting of arcs of circles having a curvature other than said first radius, R, involute curves, portions of Archimedian spirals, portions of logarithmic spirals, portions of parabolas or hyperbolas, and transitional forms between circular arcs and non-circular curves, and wherein said seal face on said periphery of said throttle has a larger breadth than the breadth of said zone of contact, in any position of sealing contact, so that a plane which coincides with the line or zone of contact may form an angle with the zero-plane (20), which is a plane parallel with said parallel sides of said throttle, and wherein sealing engagement between said throttle and said seat is attained at said angle.

8. The valve according to claims 1, wherein a radius towards a first (y) of the two points (z, y) of intersection between a circumferential middle line (19) of said periphery and said lines of intersection between said periphery and said plane of symmetry form a first angle ($\alpha_5$) to a zero-plane (20), which is a plane parallel with said parallel sides of said throttle, said angle, ($\alpha_5$), being at least 8° and not more than 16° larger than an angle, ($\alpha_1$), between said radius and one of the corresponding points of intersection in an axial section perpendicular to the plane of symmetry; and wherein a radius towards the second (z) of the said two points (z, y) of intersection forms a second angle, ($\alpha_9$), to said zero-plane, said second angle, ($\alpha_9$), being at least 8° and not more than 16° less than said angle ($\alpha_1$).

9. The valve according to claim 8, wherein an angle of inclination of a radius curvature towards said zero-plane, ($\alpha_n$), continuously increases on a half of said throttle from said angle ($\alpha_1$) towards said first angle, ($\alpha_5$); while on corresponding other half of said throttle, said angle ($\alpha_n$) decreases from said angle ($\alpha_1$) towards said second angle, ($\alpha_9$).

10. The valve according to claim 9, wherein the following expression applies for said angle of inclination of said radius of curvature towards said zero-plane, ($\alpha_n$), between said two points of intersection:

$$\alpha_n = \alpha_9 + \frac{1 - \cos \beta_n}{2} \cdot (\alpha_5 - \alpha_9)$$

wherein $\beta_n$ is an angle between a section in question and said plane of symmetry starting from said second point of intersection.

11. The valve according to any of claims 1, wherein said curvature of said lines of intersection between said seal face and said other planes of intersections continuously descreases from said first plane of intersection towards said plane of symmetry.

12. The valve according to claim 11, wherein said lines of intersection between said seal face and said plane of symmetry have radii of curvature which are at least two times as large as said first radius but less than indefinity.

13. The valve according to claim 12, wherein said radii of curvature in said plane of symmetry are between 2 and 4 times said first radius.

14. The valve according to claims 1, wherein said lines of intersection beteen said seal face and said other planes of intersection consist of arcs of circles.

15. The valve according to claim 1, wherein said lines of intersection between said seal face and said plane of symmetry consist of non-circular curves selected from the group consisting of involute curves, parts of Archimedian spirals, parts of logaritmic spirals, parts of parabolas and parts of hyperbolas; curvature of said lines of intersection decreasing in the direction in which said seat moves relative to said throttle during a closure movement of said other planes comprising transition forms between circular arcs and non-circular curves.

* * * * *